United States Patent [19]

Dimatteo et al.

[11] Patent Number: 5,623,177
[45] Date of Patent: Apr. 22, 1997

[54] ELECTRIC MOTOR WITH BRUSHES SLIDABLE IN RESPONSE TO CENTRIFUGAL FORCE

[75] Inventors: Michael A. Dimatteo, Kettering; Gary C. Fulks, Spring Valley, both of Ohio

[73] Assignee: General Motors Corporation, Detroit, Mich.

[21] Appl. No.: 449,314

[22] Filed: May 24, 1995

Related U.S. Application Data

[63] Continuation-in-part of Ser. No. 397,675, Mar. 2, 1995, Pat. No. 5,496,102.
[51] Int. Cl.$^6$ .......................... H02K 13/00; H01R 39/38
[52] U.S. Cl. ..................... 310/242; 310/245; 310/229
[58] Field of Search .......................... 310/242, 247, 310/239, 241, 245, 234, 237, 231, 229

[56] References Cited

U.S. PATENT DOCUMENTS

| | | | |
|---|---|---|---|
| 1,655,286 | 1/1928 | Nietsche | 310/242 |
| 3,383,535 | 5/1968 | Lohr | 310/268 |
| 5,049,772 | 9/1991 | Mottier et al. | 310/233 |
| 5,059,846 | 10/1991 | Concannon | 310/239 |
| 5,214,335 | 5/1993 | Phillips et al. | 310/232 |
| 5,485,048 | 1/1996 | Kuragaki et al. | 310/239 |
| 5,522,653 | 6/1996 | Fulks et al. | 303/162 |

*Primary Examiner*—Steven L. Stephan
*Assistant Examiner*—Jonathan Link
*Attorney, Agent, or Firm*—Anthony Luke Simon

[57] ABSTRACT

An electric motor comprising a rotatably mounted rotor, a commutator brush retainer mounted fixedly with respect to the rotor, wherein the commutator brush retainer rotates with the rotor, at least one brush slidably mounted to the commutator brush retainer, wherein the brush is slidable in a radial direction between a radially retracted position and a radially extended position, and a spring connected to the commutator brush retainer and to said one brush, wherein the spring biases the one brush to the radially retracted position and, wherein, during rotational movement of the motor, centrifugal force moves the one brush toward the radially extended position, wherein, as a rotational velocity of the rotor increases, the one brush moves closer to the radially extended position.

15 Claims, 6 Drawing Sheets

1

ELECTRIC MOTOR WITH BRUSHES SLIDABLE IN RESPONSE TO CENTRIFUGAL FORCE

This application is a continuation in part of U.S. patent application Ser. No. 08/397,675, filed Mar. 2, 1995, U.S. Pat. No. 5,496,102 assigned to the assignee of this invention and having a disclosure incorporated herein by reference. This application is related to the subject of copending U.S. patent application H-190015, filed concurrently with this application, assigned to the assignee of this invention and having a disclosure incorporated herein by reference.

This invention relates to an electric motor.

BACKGROUND OF THE INVENTION

A typical switched reluctance motor comprises a plurality of stator phase coils fixedly mounted in a motor housing and a rotatably mounted rotor with plurality of soft magnetic poles, i.e., typically formed from a material with ferromagnetic properties in a lamina stack. In a known single phase operation, the stator phase coils are individually energized, creating magnetic fields that act on the soft magnetic poles of the rotor in the form of rotational torque that causes the rotor to rotate. Rotor position feedback is typically used to determine when the rotor is positioned such that it is desirable to de-energize the currently energized phase coil and energize the next phase coil. Solid state switching devices are typically used to control energization and de-energization of the coils and an electronic motor controller is typically used to control gating of the solid state switching devices.

In a known switched reluctance motor control, the solid state switching devices are gated in a manner such that the degree of phase advance of the stator coils increases with higher rotational velocities of the motor rotor.

SUMMARY OF THE PRESENT INVENTION

An electric motor in accordance with the present invention is characterized by the features specified in Claim 1.

Advantageously, this invention provides an electric motor for providing switched reluctance operation that includes a commutator to eliminate solid state switching devices previously necessary to operate the motor.

Advantageously, this invention provides an electric motor for providing switched reluctance operation that is suitable for use with control as simple as or simpler than conventional DC brush motor controls.

Advantageously, this invention provides an electric motor for providing switched reluctance operation that achieves stator coil energization phase advance without the use of solid state switching devices.

Advantageously, this invention provides an electric motor for providing switched reluctance operation including a brush commutator that provides a varying angle phase advance of the stator coils.

Advantageously, this invention provides an electric motor for providing switched reluctance operation including a brush commutator that advances the phase angle of the stator coil energization as a function of rotor speed.

Advantageously, this invention provides an electric motor with a commutator having brushes, on a rotating portion of the commutator, spring biased to a radially inner position. As the motor speed increases, centrifugal force counters the spring bias force and causes the brushes to travel radially outward. A stator plate is fixed with respect to the motor housing and has an annular portion with a series of contact plates against which the brushes make brush contact. During low speed operation, the brushes make contact against radially inner portions of the contact plates and as the motor speed increases, the brushes make contact against radially outer portions of the contact plates. The contact plates are shaped to optimize phase angle advance of the stator coils over the operating speed of the motor.

Advantageously, this invention provides an electric motor with a commutator and brushes that provide varying phase angle advance with motor speed for use in any of: switch reluctance motors, permanent magnet rotor motors and permanent magnet field motors.

Advantageously, in a preferred example of this invention, an electric motor is provided comprising: a rotatably mounted rotor; a commutator brush retainer mounted fixedly with respect to the rotor, wherein the commutator brush retainer rotates with the rotor; at least one brush slidably mounted to the commutator brush retainer, wherein the brush is slidable in a radial direction between a radially retracted position and a radially extended position; and a spring connected to the commutator brush retainer and to said one brush, wherein the spring biases the one brush to the radially retracted position and, wherein, during rotational movement of the motor, centrifugal force moves the one brush toward the radially extended position, wherein, as a rotational velocity of the rotor increases, the one brush moves closer to the radially extended position.

Advantageously, in another preferred example of this invention, the electric motor is provided further comprising: a commutator plate mounted fixedly in relation to a housing of the motor, wherein the rotor rotates in relation to the commutator plate; an annular portion of the commutator plate coaxial with the rotor, the annular portion having an inner radius engaging the one brush when the one brush is in the radially retracted position, the annular portion having an outer radius engaging the one brush when the one brush is in the radially extended position; and a plurality of contactors in the annular portion of the commutator plate, the contactors extending from the inner radius to the outer radius.

Advantageously, in a preferred example of this invention, a method of operating an electric motor comprises the steps of spring biasing a commutator brush to a radially retracted position and responsive to rotation of a rotor of the motor, using centrifugal force on the commutator brush to move the brush toward a radially extended position, wherein, as a rotational velocity of the rotor increases, each first brush moves closer to the radially extended position.

BRIEF DESCRIPTION OF THE DRAWINGS

The present invention will now be described, by way of example, with reference to the accompanying drawings in which.

DETAILED DESCRIPTION OF THE INVENTION

Figure 1:
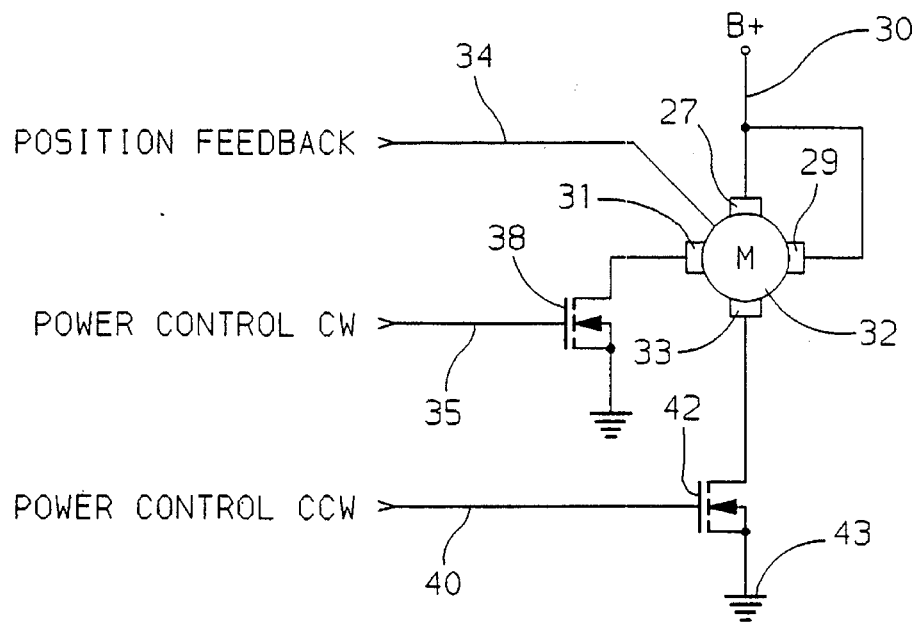
FIG. 1 illustrates an example switched reluctance motor power configuration according to this invention.

Referring now to FIG. 1, switched reluctance motor 32 according to this invention is shown with four power input terminals 27, 29, 31 and 33. Terminals 27 and 33 provide power during counterclockwise rotation of the motor and terminals 29 and 31 provide power during clockwise rotation of the motor 32. The current path for power provided to the motor is from the +V voltage line 30 to the motor 32, through the solid state transistor 38 or 42, and to ground 43.

When line 40 is controlled so that solid state switch 42 is open and when line 36 is controlled so that solid state switch 38 passes current from terminal 31 to ground 43, the motor 32 rotates in the clockwise direction. When line 36 is controlled so that solid state switch 38 is open and when line 40 is controlled so that solid state switch 42 passes current from terminal 33 to ground 43, the motor 32 rotates in the opposite or counterclockwise direction. If desired, control lines 36 and 40 can be connected to a PWM controller to control the amount of power to the motor 32 by pulse width modulating the switch 38 to move the rotor of motor 32 in the clockwise direction and by pulse width modulating switch 42 to move the rotor in the counterclockwise direction.

In implementations in which motor position feedback is desired, feedback can be sensed in any known manner including use of a position encoder that rotates with the motor rotor together with one or more Hall effect sensors, or any other known type of position feedback providing a position signal on line(s) 34. Alternatively, position feedback can be implemented as described herein further below.

Example motor operation according to this invention will be described now with reference to FIGS. 2–5.

Figure 2:
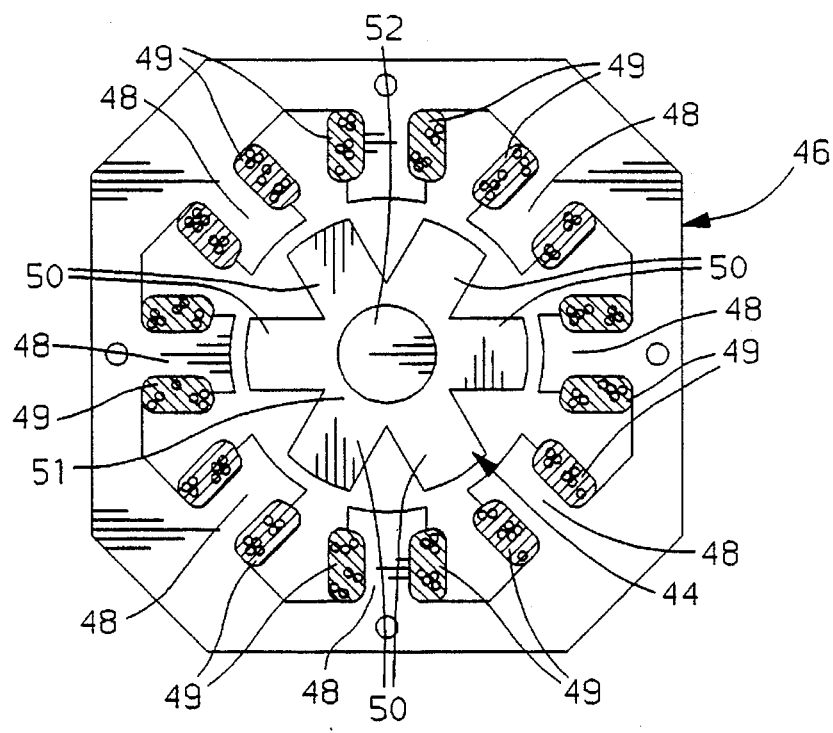
FIG. 2 illustrates an example cross section of a switched reluctance motor incorporating this invention.

Referring to FIG. 2, the cross section of an example switched reluctance motor stator 46 and rotor 44 for use with this invention includes a plurality of stator phase coils 49, each selectively energizing to create magnetic fields through one of the plurality of stator soft magnetic poles 48. The stator 46 shown is a four phase stator in which the coils 29 are energized in four separate phases. There are eight stator coils 49 and soft poles 48 shown because each diametrically opposed pair of coils 49 is energized simultaneously. The rotor 44 comprises core 51 including, in this example, six soft magnetic poles 50. The rotor core 51 is fixedly mounted on motor shaft 52, which is rotatably mounted in the motor housing in a known manner.

The operation of the switched reluctance motor shown generally involves exciting each phase of the stator winding or each diametrically opposed pair of coils 49 in a selected order based on position of the rotor 44. As a coil phase 49 is energized, the magnetic field created by that coil phase 49 acts on the rotor 44, creating a rotational torque tending to align the closest soft pole 50 with the soft pole 48 of the energized phase coil 49. When the soft pole 50 is aligned with the soft pole 48 of the energized phase winding 49, no more rotational torque is provided by that phase coil 49. The energized phase coil 49 is switched off and the next phase coil is energized to act on another of the soft poles 50 to bring that soft pole 50 into rotational alignment with the pole 48 of the energized coil 49.

Figure 3:
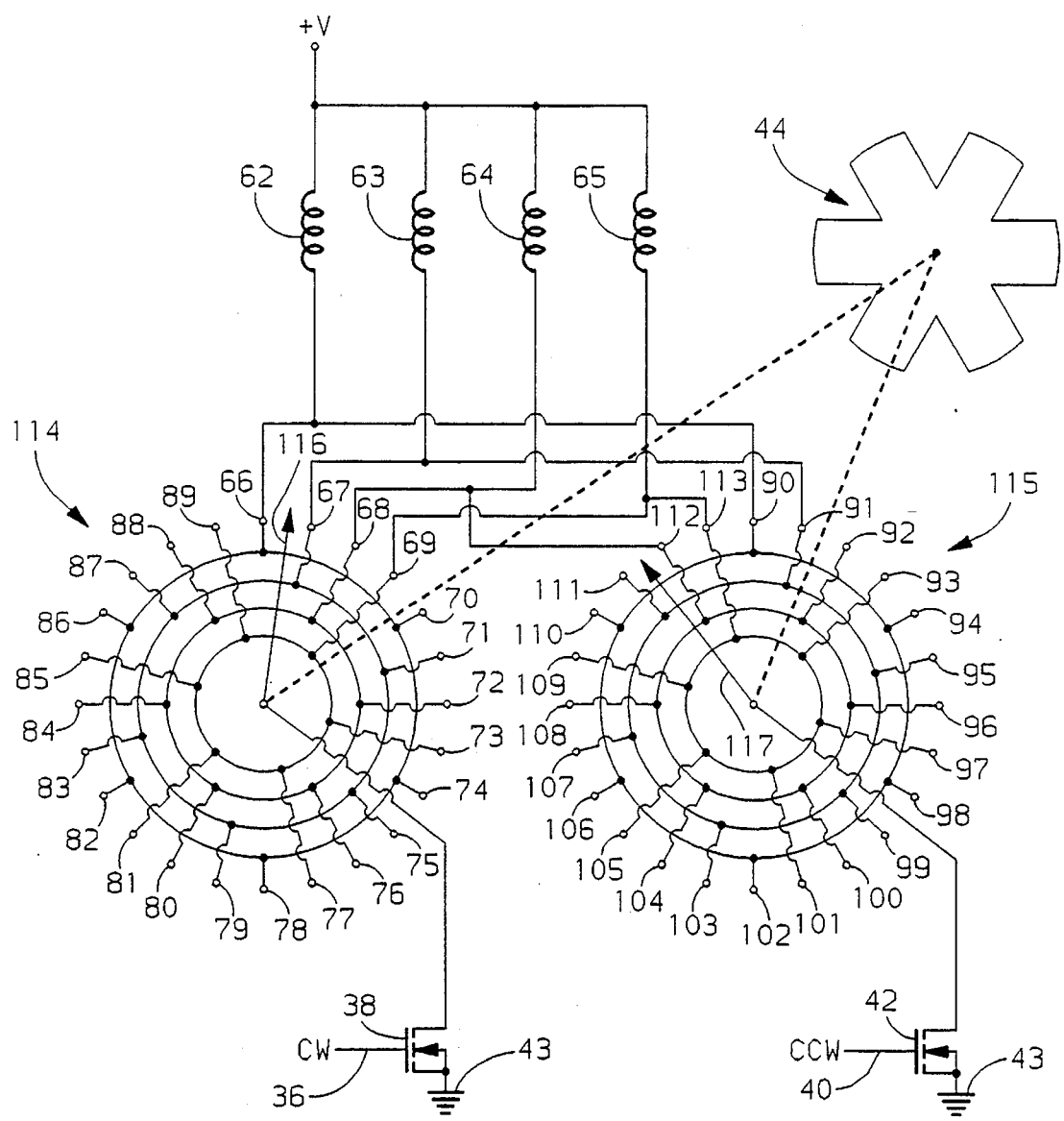
FIG. 3 illustrates an example switched reluctance motor electrical schematic according to this invention.

Referring now to FIG. 3, the electrical schematic for the switched reluctance motor of FIG. 2 includes the phase 1, 2, 3 and 4 stator coils 62, 63, 64 and 65, respectively, commutators 114 and 115 and the solid state switches 38 and 42. In the example shown in FIG. 2, each stator coil 49 has a diametrically opposed stator coil 49, the pair of which are simultaneously activated and deactivated. Each of the coils 62, 63, 64 and 65 in FIG. 3 represents, for the example shown in FIG. 2, a pair of diametrically opposed stator coils (either connected in series or connected in parallel).

One end of each stator phase coil 62, 63, 64 and 65 is connected to the +V voltage supply line 30. The other end of each stator phase coil 62, 63, 64 and 65 is connected to selected contact plates on commutator 114 and on commutator 115. The first phase coil 62 is connected to contact plates 66, 70, 74, 78, 82 and 86 on the commutator 114 for clockwise operation of the motor and to contact plates 90, 94, 98, 102, 106 and 110 on commutator 115 for counterclockwise operation of the motor. The second phase coil 63 is connected to contact plates 67, 71, 75, 79, 83, 87 on the commutator 114 for clockwise operation and to contact plates 91, 95, 99, 104, 107 and 111 on the commutator 115 for counterclockwise operation. The third phase coil 64 is connected to contact plates 68, 72, 76, 80, 84 and 88 on the commutator 114 for clockwise operation and to contact plates 92, 96, 100, 104, 108 and 112 on commutator 115 for counterclockwise motor operation. The fourth phase coil 65 is connected to contact plates 69, 73, 77, 81, 85 and 89 on commutator 114 for clockwise operation of the motor and to contact plates 93, 97, 101, 105, 109 and 113 on commutator 115 for counterclockwise operation of the motor.

Each commutator includes at least one rotating brush represented by arrow 116 for commutator 114 and by arrow 117 for commutator 115. The brushes rotate with the motor rotor and, in a consecutive manner, brush 116 makes electrical contact with the contact plates 66–89 during clockwise rotation of the motor rotor and brush 106 makes electrical contact with contact plates 90–113 during counterclockwise rotation of the motor rotor.

Brush 116 is connected to solid state switch 38, which may be a heavy duty FET or, for large duty applications, an IGBT. Alternatively, solid state switch 38 (and solid state switch 42) may be replaced by an electromagnetic relay or any other type of mechanical switch. Brush 117 is electrically connected to similar solid state switch 42. The solid state switches 38 and 42 are alternately controlled. When switch 38 is controlled by line 36 to be closed, providing a closed circuit between brush 116 and ground 43, switch 42 is controlled by line 40 to be open, providing an open circuit between brush 117 and ground 43. When solid state switch 42 is controlled by line 40 to be closed, providing a closed circuit between brush 117 and ground 43, then solid state switch 38 is controlled by line 36 to be open providing an open circuit between brush 116 and ground 43.

In operation of the motor in a clockwise direction, the brush 116 makes contact with one of the contact plates of the commutator 114, providing a closed circuit between one of the stator phase coils 62, 63, 64 and 65 and ground 43, thus energizing the stator phase coil connected to the contact that is making electrical contact with brush 116. The brush 116 is oriented with respect to the contact plates 66–89 such that, when brush 116 contacts a contact causing one of the stator coils to be energized, the energized stator coil acts on the rotor of the motor causing the rotor to turn in the clockwise direction. Since the brush 116 rotates with the rotor, it advances to the next of the contact plates, 66–89, which energizes the next phase coil of the stator winding, causing continued rotation of the rotor 44. The magnitude of electrical power provided to the energized coil and, therefore, the output torque of the motor, are controlled by pulse width modulating the gate of the switch 38 with the control signal on line 36, in which case a larger duty cycle signal on line 36 provides increased rotational torque of the motor.

During rotor rotation in the counterclockwise direction, solid state switch 42 is closed so that brush 117 closes the ground 43 circuit to the coil connected to the contact plate making electrical contact with the brush 117. Brush 117 is oriented with respect to the rotor 44 such that, when one of the contact plates 90–113 is contacted by brush 117, the coil activated acts on one of the poles of rotor 44 to cause the rotor 44 to rotate in the counterclockwise direction. This movement of the rotor 44 causes movement of the brush 106, advancing the brush to the next contact plate 90–113, energizing the next phase coil to cause further counterclockwise rotation of rotor 44. The magnitude of electrical power provided to the energized coil and therefore output torque of the motor is controlled by pulse width modulating the gate of the switch 42 with the control signal on line 40.

Position feedback can be easily obtained by monitoring the voltage drop across one or more of the stator coils. For example, a line coupled to contact plate 66 would provide a signal with a pulse that goes low six times with every revolution of the motor rotor, when stator phase winding 62 is energized. In another example, four feedback lines coupled to contact plates 66, 67, 68 and 69 would provide signals indicating every π/24 angular advance of rotor rotation.

Figure 4:
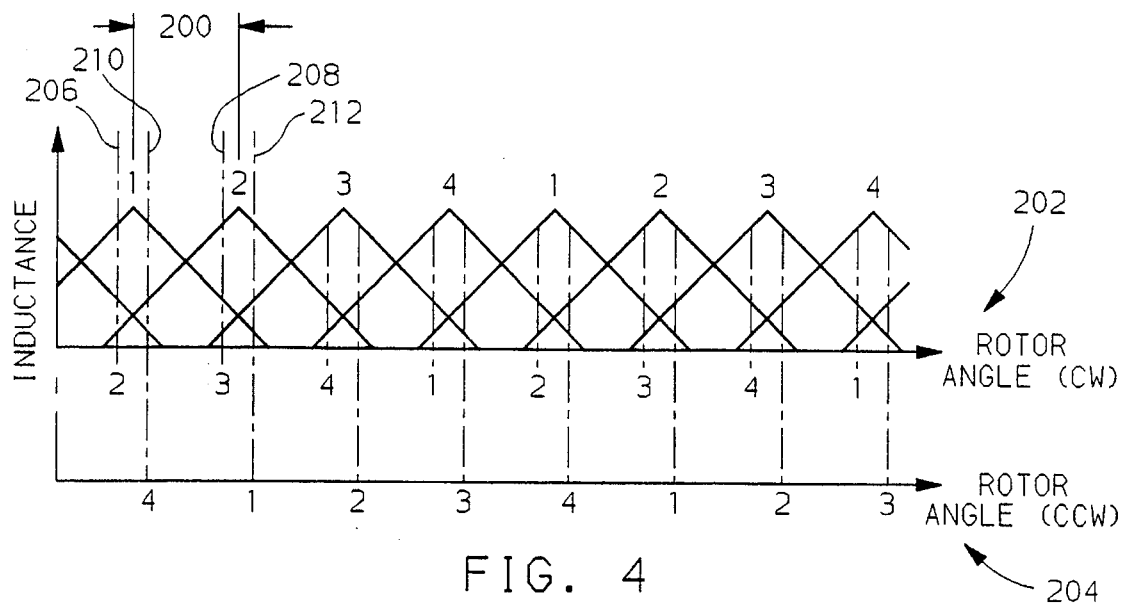
FIG. 4 illustrates example switching of switched reluctance stator phase coils according to this invention.

FIG. 4 shows an inductance map with each peak of the inductance traces corresponding to a rotor position in which a rotor pole aligns to a stator coil. For each stator coil, the stator coil inductance peaks when a pole of the rotor 44 becomes directly aligned with that particular stator coil. Because the stator and rotor are provided with a different number of poles, each phase of the stator coils has a different inductance peak time. For the example in which the stator has four phases and the rotor has three, i.e., the example shown in FIGS. 2 and 3, the inductance map appears as illustrated in FIG. 4. With reference also to FIG. 2, because each stator phase coil 49 has a diametrically opposed coil 49 of the same phase and because each rotor soft pole 50 has a diametrically opposed pole 50 of the same phase, the angular distance between consecutive inductance peaks for each coil phase is 60 degrees of rotor rotation and the angular distance 200 between the first and second phase inductance peaks is 15 degrees of rotor rotation.

The numbers in row 202 illustrate a positioning of the brush 116 in commutator 114 with respect to the peak inductances to affect clockwise rotation of the rotor 44. The numbers corresponding to row 204 illustrate the position of brush 117 in commutator 115 with relation to the peak inductances to affect counterclockwise rotation of rotor 44.

For clockwise rotation, the inductance map is read from left to right because the phases are activated consecutively 1, 2, 3 then 4, then 1 again and the pattern is repeated. For example, in row 202 when the rotor position corresponds to the point on the inductance map referenced 206, and before the rotor position corresponds to the point referenced 208, the second phase coil is activated by brush 116 making electrical contact with one of the contact plates 67, 71, 75, 79, 83 or 87 on commutator 114. Similarly, after the rotor achieves a position corresponding to the point referenced 208, and before obtaining a position corresponding to reference 214, the third coil phase is activated by brush 116 making electrical contact with one of contact plates 68, 72, 76, 80, 84 or 88. The remaining of the phases are activated in a similar manner with the activated phase coils identified by the numbers listed in row 202.

For counterclockwise rotation, the inductance map is read from right to left because the phase coils are activated 4, 3, 2 then 1, then 4 again in a repeating pattern. During the counterclockwise rotation, when the rotor 44 is positioned such that the inductance of phase 1 begins rising, which is a position, for example, corresponding to reference 212 in FIG. 4, the brush 106 is positioned in commutator 115 so that it energizes the first phase of the stator windings by making electrical contact with one of the contact plates 90, 94, 98, 102, 106 or 110. This causes energization of the first phase coil and rotation of rotor 44 with which brush 117 rotates. When the rotor 44 reaches the position 210 on the inductance map, which is the beginning of the rise in inductance in the fourth coil phase, brush 117 is positioned so that it energizes the fourth phase or, in other words, is positioned so that it makes electrical contact with one of the contact plates 93, 97, 101, 105, 109 and 113. The remaining phases are activated in a similar manner with the activated coils identified by the numbers listed in row 202. In this manner, power is selectively applied to brushes 116 and 117 through the solid state switches 38 and 42, providing bi-directional operation control of the switched reluctance motor.

Figure 5:
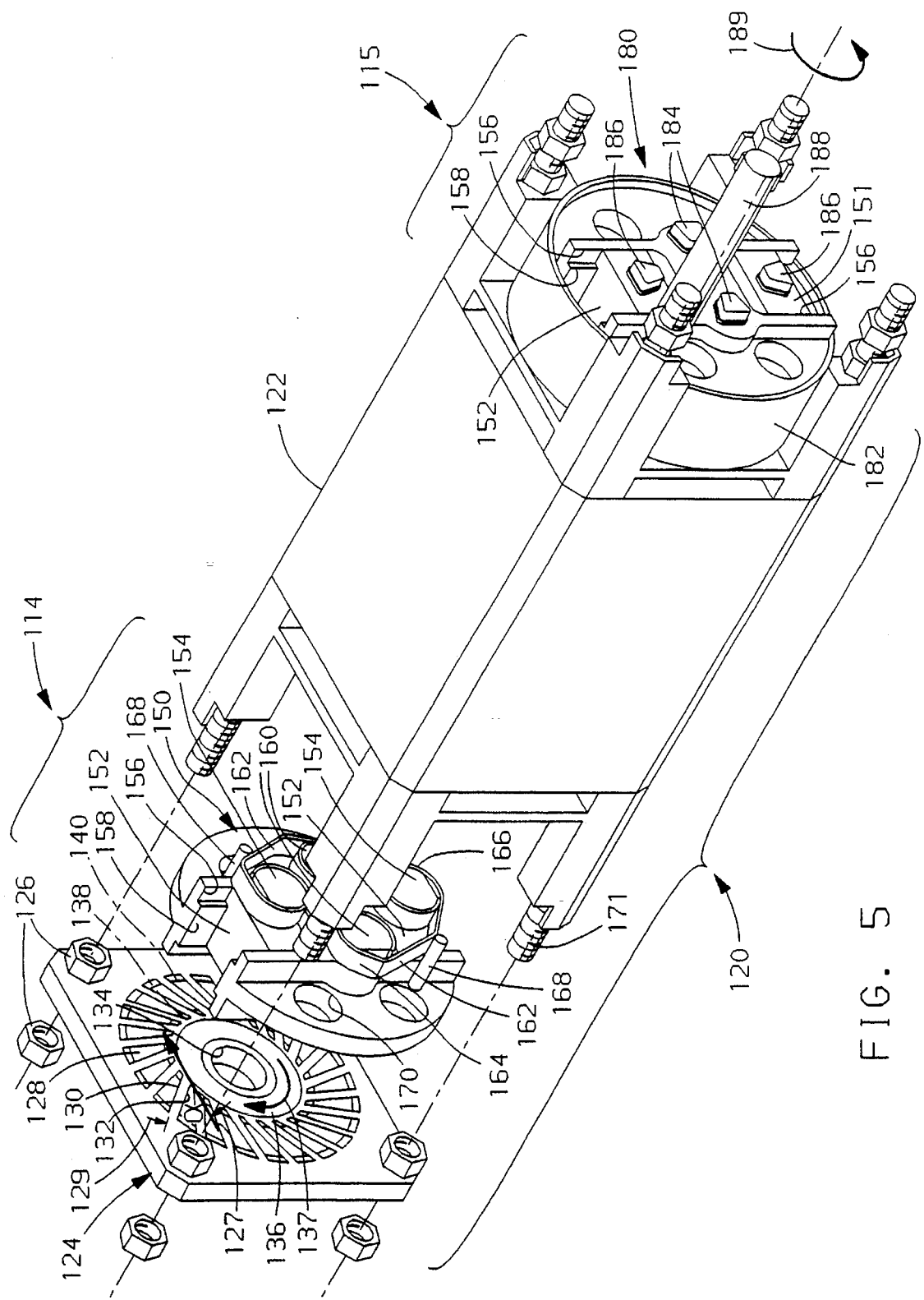
FIG. 5 illustrates an exploded view of an example switched reluctance motor according to this invention.

Referring now to FIG. 5, an example switched reluctance motor apparatus according to this invention is shown. The motor 120 in FIG. 5 comprises motor housing 122 in which is mounted a stator coil of the configuration shown in FIG. 2 and in which is rotationally mounted a rotor, also of the configuration shown in FIG. 2.

Commutators 114 and 115 are provided on the two ends of the motor 120 and each commutator 114 and 115 is identical to the other. Commutator 114 includes commutator plate 124 and commutator brush unit (also referred to as the commutator brush retainer) 150. Commutator 115 includes commutator brush unit 180 and a commutator plate identical to commutator plate 124 but omitted from the drawing so that the brushes 184 and 186 may be viewed. Commutator 114 is shown with brush holder cover 182, which is cylindrical in shape and fixedly mounted to the housing 122. A similar cover for commutator 114 is omitted for clarity. The commutator 114 provides the switching of power to the stator phase windings for clockwise rotation of the motor rotor, or for rotation of the rotor in the direction of arrow 137. Commutator 115 provides the switching of power to the stator phase coils for counterclockwise rotation of the rotor, or for rotation in the direction of arrow 189. The commutator plate 124 includes twenty four contact plates 128 occupying an annular portion of plate 124, as shown. Each contact plate 128, and its diametrically opposed plate 128, is electrically connected to one of the stator coil phases in the manner shown in FIG. 3.

Radially interior of the twenty four contact plates 128 is contact ring 137. Contact ring 137 is connected to solid state switch 38 (FIG. 3) and provides power to the commutator brush unit 150. The commutator plate 124 is mounted in place on the housing 122 through nuts 126 threadably engaged with the posts 170 of the housing 122. Central opening 134 of the commutator plate 124 acts as a bearing for the rotor shaft of the motor 120. The brush unit 150 includes brushes 184, 186 and is mounted so that it rotates with the rotor. Each brush 184, 186 faces in a brush direction parallel to the axis of rotation of the rotor and each brush 184, 186 has a brush face on a brush direction side of the brush that engages, or makes sliding contact with, the annular center contact ring 136 (brushes 184) or the twenty four contact plates 128 (brushes 186).

The brush unit 150 includes two slidably mounted brush holders 152 mounted in slots 156. Guides 158 are provided limiting movements of brush holders 152 to travel in the radial direction with respect to the axis of rotation of the rotor and commutator brush unit 150. To limit sliding friction, linear bearings may be implemented in a known manner. At the back of each slidably mounted brush holder 152 is a post 154.

The brush unit 150 also includes two fixedly mounted brush holders 183 holding brushes 184, which are the contact ring brushes. At the back of each fixedly mounted brush holder 183 is a post 160. Each commutator includes two metal torsion springs 162. Each spring 162 is connected to one of the fixed brush holder posts 160 and to one of the sliding brush holder posts 154. One end 164 of each spring 162 wraps around the post 160 and the other end 166 of each spring 162 wraps around the post 154. Post 168 is provided to maintain the spring 162 in the desired position.

The torsion springs 162 shown maintain the sliding brush holders 152 spring biased to radially inner positions. During operation of the motor when the rotor is rotating, as the motor speed increases, centrifugal force operating on the slidable brush holder 152 counters the bias force of the spring 162. This centrifugal force causes the spring 162 to deflect and allows the sliding brush holder 152 to move incrementally in a radially outward direction within slot 156. The amount of movement of the sliding brush holder 152 in the radially outward direction depends on rotational velocity of the motor rotor.

According to this invention, the brush holder design shown provides, with commutator plate 124, a change in phase advance of the stator windings as motor speed increases. In general, it is desirable to provide increased phase advanced of the switched reluctance motor as the motor speed increases to allow for the attainment of higher operating motor speeds. To provide for this phase advanced, according to this invention, commutator plate 124 includes contact plates 128, each having a leading edge 130 at an acute angle 129 to a vector 127 tangent to the direction of rotation of the rotor at the radially inner position of the annular portion occupied by the contact plate 128. This angle alpha identified by reference 129 in the figure provides a phase advance operation of the motor as the motor speed increases.

During low speed operation of the motor, the brushes 186 travel along path 138 at the radially inner portion of contact plates 128. During high speed operation of the motor, the path of the brushes 186 moves radially outward toward the path 140 on a radially outer portion of contact plates 128. Because the leading edge 130 of the contact plate 128 is at the angle alpha to a vector 127 tangent to the direction of rotation of the motor, as the sliding brush holder 152 moves radially outward in brush unit 150, the brushes 186 first contact each contact plate 128 at an angularly advanced position with respect to first contact of the same contact plate during slower rotational velocities of the motor rotor. Thus, according to this invention, the commutator is provided with a mechanical phase advancing operation.

In the motor shown, commutator 114 is energized by providing power to the contact ring 136 from the solid state switch 38 (FIG. 3) and the commutator 115 is energized by providing power to a similar contact ring on the other commutator plate (not shown) from the solid state switch 42 (FIG. 3). When one of the solid state switches 38, 42 is closed, power flows through the energized phase coil, to the contact plate 128 contacting a brush 186, through the brush 186, through the torsion spring 162, through the brush 184 and through the contact ring 136 to the switch 38 or 42 (whichever is closed) and to ground.

In the above example, the number n of stator coil phases is four and the number m of soft magnetic rotor pole phases is three. This invention can be implemented in a motor with any suitable or known combination of coil phases and rotor pole phases.

Figure 6:
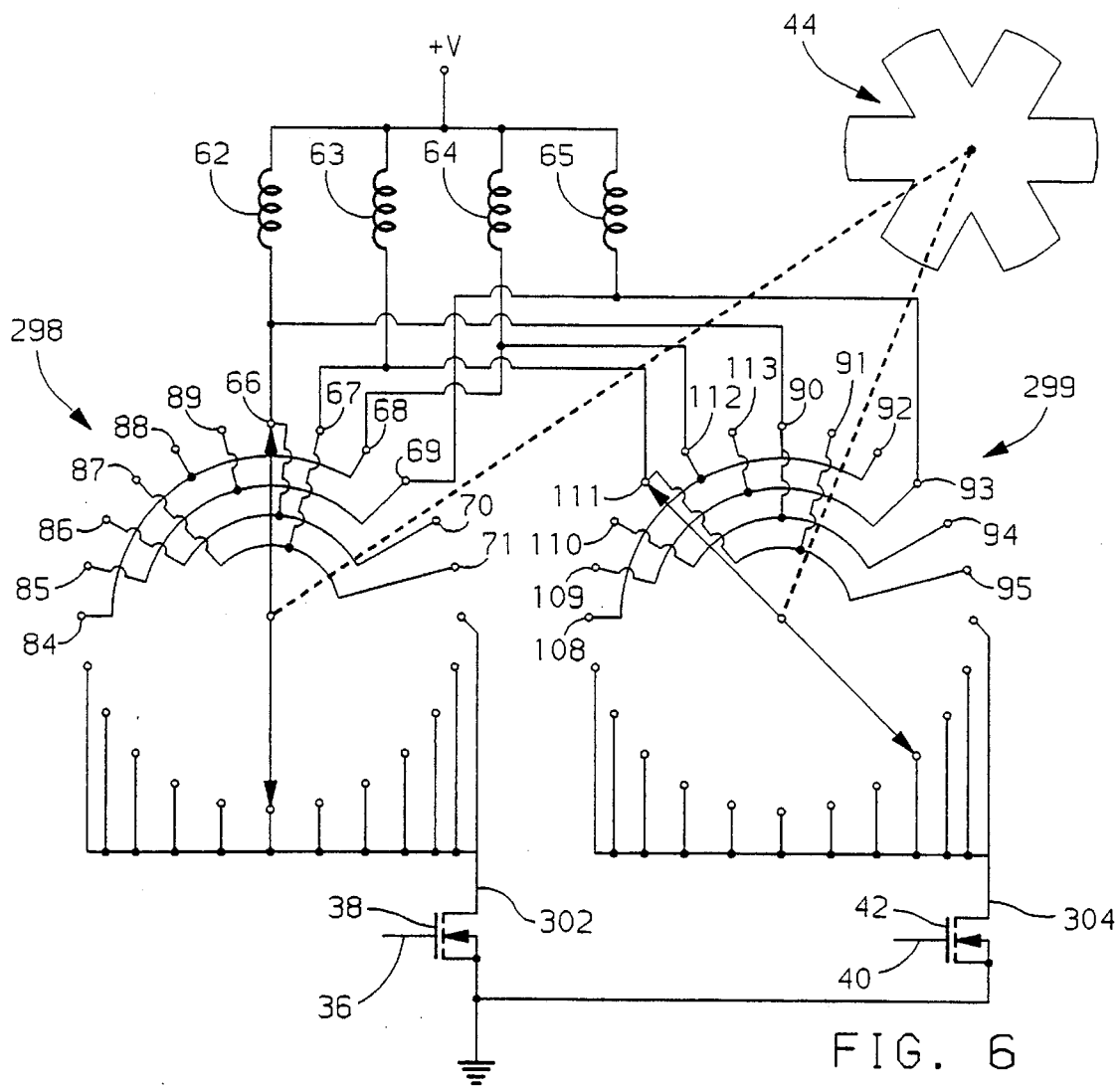
FIG. 6 illustrates an example switched reluctance motor electrical schematic according to this invention.

Referring now to FIG. 6, an alternative schematic to the schematics shown in FIG. 5 is provided that allows elimination of the center ring 136 of FIG. 5. The phase 1, 2, 3 and 4 stator coils 62–65 are shown and are connected to the contacts 66–71 and 85–89 of commutator 298 and to contacts 90–95 and 108–113 of commutator 299 in the same manner as described above with reference to FIG. 3. However, the remaining contacts of the commutator 298 are connected to a common node, line 302, which is connected to transistor 38. In commutator 299, the remaining contacts are connected to a common node, line 304, which is connected to transistor 42. The circuit of the two rotating brushes in each commutator electrically connects the brushes together so that each phase coil is selectively connected to the nodes 302, 304.

With the modification of the motor shown on FIG. 5 according to the schematic of FIG. 6, the center ring and brushes thereof are eliminated and the two diametrically opposed brushes in the brush holder 152 are electrically connected together.

Figure 7:
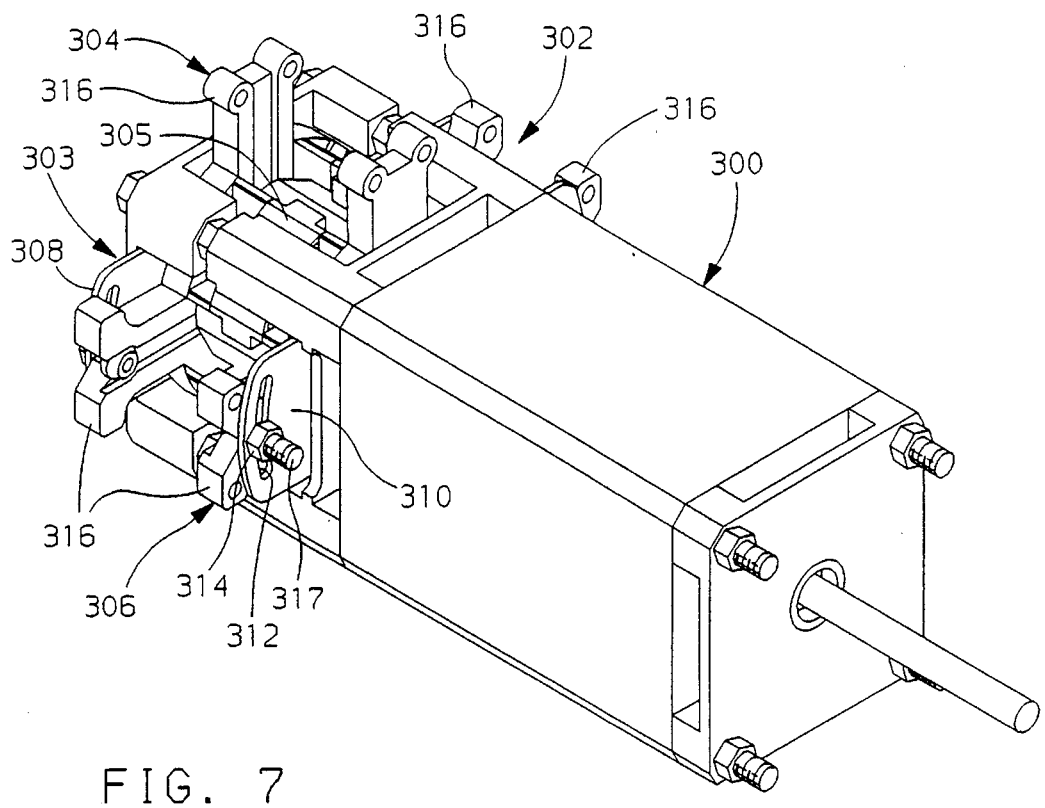
FIG. 7 illustrates an example switched reluctance motor according to this invention.

Referring now to FIG. 7, a second example motor 300 according to this invention is shown and has a single commutator assembly 303 at one end 302 of the motor for providing power control of rotation in both directions. A circuit schematic for the motor is that shown in FIG. 6. The commutator assembly 303 includes two commutator plates 304, 306 mounted facing each other in a fixed position with respect to the housing of the motor 300. The commutator plates 304, 306 are attached to mounting plates 308, 310 via bolts 317 through holes in the extending arms 316 of the commutator plates 304 and 306 and through the slots 312 in the mounting plates 308 and 310. Nuts 314 are threadably engaged on the bolts 317.

A brush assembly 305 is mounted between the two facing commutator plates 304 and 306 and is fixedly mounted with respect to the motor axle shaft and rotor so that as the motor rotor rotates, the brush assembly rotates with respect to the housing of motor 300. The brush assembly 305 can be better understood with respect to FIG. 8.

Figure 8:
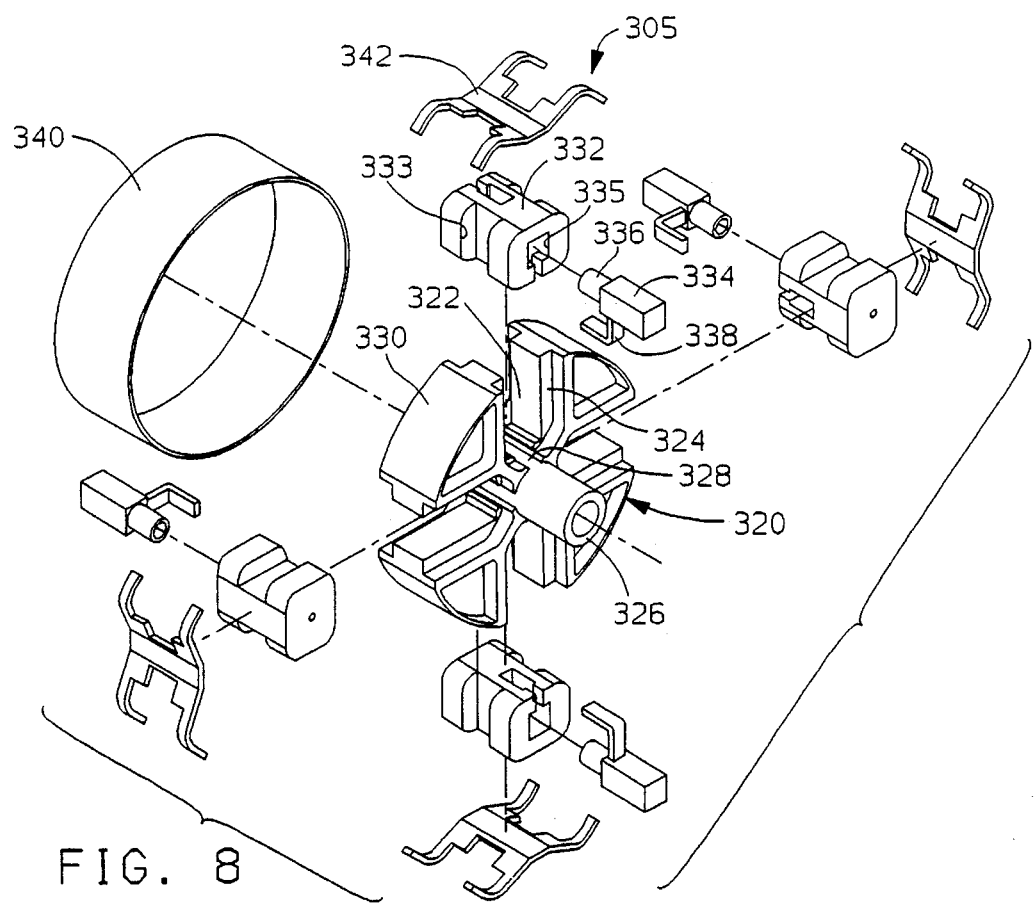
FIG. 8 illustrates an exploded view of a brush assembly for the motor of FIG. 7.

Referring now to FIG. 8, the brush assembly includes a main housing 320 including four radially extending channels 322, equally spaced about the housing center 326, which attaches to the motor axle shaft in a known manner. Each channel 322 includes a rail 324 to which a brush holder 332 slidably engages via a slot 333. Each brush holder 332 has a diametrically opposed brush holder 332. Each brush holder 332 has an opening 335 in which a brush 334 slidably engages and is biased to the extended position via a coil spring 336. Each brush 334 has a flexible wire 338 electrically connected thereto. Each brush 334 faces in the same axial direction as a diametrically opposed brush 334 and faces in the opposite direction as the brush 334 spaced radially 90 degrees about the housing center 326. Each brush 334 is electrically connected via the wires 338 to its diametrically opposed brush 334.

Radial springs 342 bias each brush holder 332 to the radially inner position but allow centrifugal force to move the brush holder 332 to radially extended positions during rotational movement of the motor. The degree of movement of each brush holder 332 to the radially extended position correlates to the rotational velocity of the motor shaft and the brush assembly. The movement of the brush holders 332 and brushes 334 therein toward the radial extended positions provide the phase advance for the motor.

Retaining ring 340 fits annularly around the housing 320 and provides a seat for the extending arms of the radial springs 342 and provides the surface against which the extending arms can laterally (arcuately) slide when the center of the radial spring 342 that presses against the brush holder 332 is deflected in the radially extended direction due to centrifugal force.

At the radially inner portion of each channel 322 is an axially directed channel 328, which the wire 338 can occupy when the brush holder 332 is in the radially retracted position. One pair of the diametrically opposed brushes 334 facing one axial direction engages commutator plate 304 and the other pair of diametrically opposed brushes 334 facing the opposite axial direction engages the other commutator plate 306.

Figure 9:
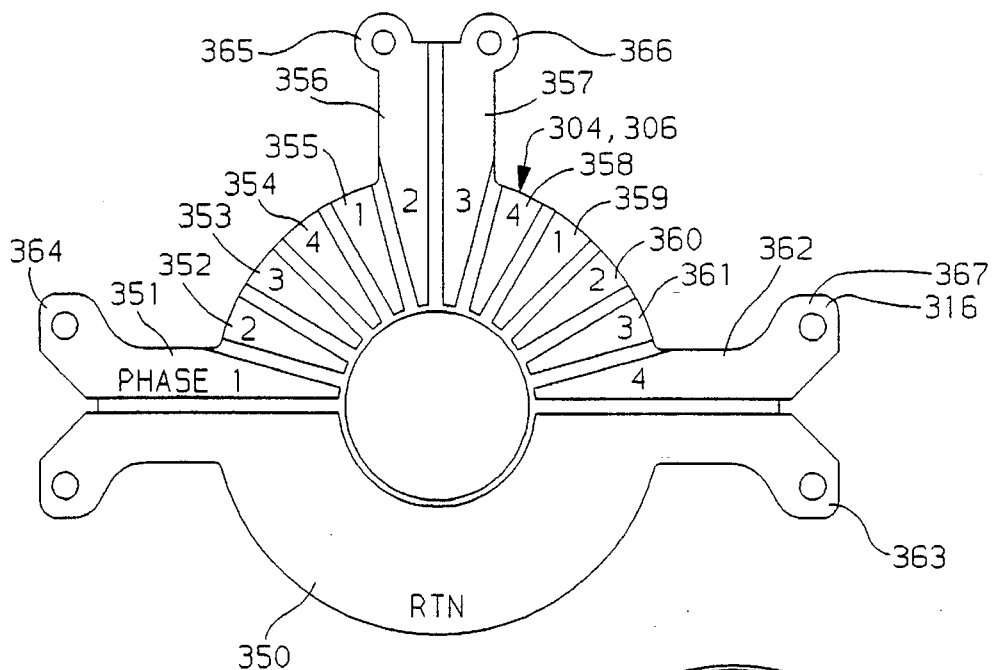
FIG. 9 illustrates a commutator plate for use with the motor of FIG. 7.

Referring now to FIG. 9, an example commutator plate for use in the motor shown in FIG. 7 is shown. The commutator plate includes contact plates 350–362 corresponding to the similarly positioned contact portions shown in electrical schematic FIG. 6. Each contact plate 350–362 includes a conductive path (some, not shown, on the reverse side of the contact plate) leading to a connecting point 363 on the extending arms 316. For example, connecting point 364 is connected to phase 1 of the stator coils and thus is connected to contact plates 351, 355 and 359. Connecting point 365 is connected to phase 2 of the stator coils and thus is connected to contact plates 352, 356 and 360. Connecting point 366 is connected to 3 of the stator coils and thus is connected to contact plates 353, 357 and 361. Connecting point 367 is connected to phase 4 of the stator coils and thus is connected to contact plates 354, 358 and 362. It is noted that, in the example shown, the leading edge of each contact plate is arcuately spaced 15 degrees from its neighboring contact plate. The leading edges of the contact plates 351–362 are preferably angled to provide phase advance as the brushes move toward the outer radial outer portions of the contact plates 351–362.

The commutator plates 304 and 306 are mounted facing each other, as shown in FIG. 7, on either side of brush assembly 305 so that two of the brushes engage one of the commutator plates 304, 306 and the other two brushes engage the other commutator plate 304, 306.

In an advantage provided by this invention, the commutator plate 304, 306 shown in FIG. 9 includes twelve contact plates 351–362, which are coupled to the four stator coil phases, and the fifth contact plate 350, all arcuately disposed in an annular contact area shown. The twelve contact plates 351–62 are disposed over one 180 degree arcuate portion of the annular contact area and the fifth contact plate 350 is disposed over the other 180 degree arcuate portion of the annular contact area. Advantageously, according to this invention the configuration of contact plates 350–362 on the commutator plate can be applied generically to any commutator plate. More specifically, for a motor with n stator coil phases, and m soft poles on the rotor, the commutator plate includes n*m+1 contact plates, n*m of which are each coupled to the stator coil phases. The n*m contact plates coupled to the stator coil phases are disposed about one 180 degree arcuate portion of the contact area and the other contact plate is disposed about the other 180 degree arcuate portion of the contact area.

Figure 10:
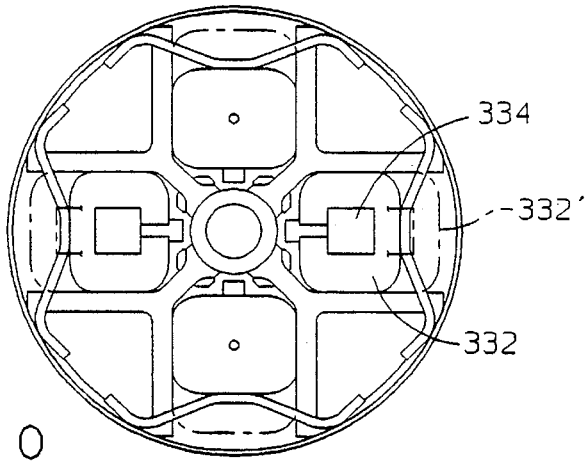
FIG. 10 illustrates an axial view of the brush assembly of FIG. 8.
Figure 11:
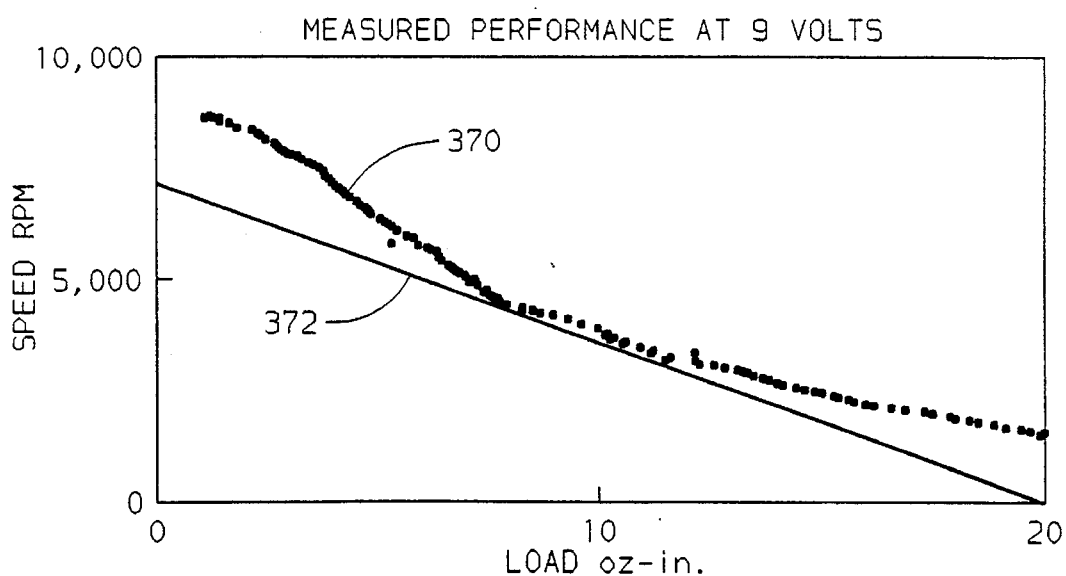
FIG. 11 illustrates an example speed versus torque curve of a motor constructed according to this invention.

Referring now to FIG. 10, an axial view of the brush assembly shown in FIG. 8 shows the brushes 332 in the retracted position and in dash lines shows the brushes 332' in the radially extending position that occurs during high rotational velocity of the motor rotor and brush assembly due to the operation of the centrifugal force of the brush holders 332 against the springs 342.

The example of this invention shown in FIGS. 7–10 requires only a single rotating brush assembly and a total of four brushes. Each brush is electrically connected to its diametrically opposed brush, for example, via a flexible wire 370 that can flex and accommodate the radial movement of the brushes and the brush holders while maintaining the diametrically opposed brushes electrically connected to each other.

An example speed versus torque curve of a motor according to this invention is shown in FIG. 10. The curve 370 illustrates that a motor according to this invention achieves a speed versus torque curve that is non-linear to provide both increased top end speed and increased stall torque of the motor. For example, the curve 370 is compared to a speed versus torque curve 372 for a typical brush motor of the type that includes permanent magnets. The conventional brush motor speed versus torque curve 372 plot is typically a straight line as shown. The present invention provides advantageous brush motor response as compared to the prior art response 372 because the prior art response 372 does not extend top end speed or stall torque as does the brush motor according to this invention.

The motor control scheme provided by this invention as shown in FIGS. 1–11 eliminates the necessity of the conventional H-bridge for providing servo motor control, thus eliminating at least two solid state switches without requiring the addition of a −V voltage supply line.

While illustrated with reference to a switched reluctance motor, it is clear to those skilled in the art that this invention is equally applicable to permanent magnet field motors in which it is desirable to vary phase advance of rotor or stator coils with rotor speed.

We claim:

1. An electric motor comprising:

a rotatably mounted rotor;

a commutator brush retainer mounted fixedly with respect to the rotor, wherein the commutator brush retainer rotates with the rotor;

at least one brush slidably mounted to the commutator brush retainer, wherein the brush is slidable in a radial direction, with respect to an axis of rotation of the rotor, between a radially retracted position and a radially extended position;

a spring connected to the commutator brush retainer and to said one brush, wherein the spring biases the one brush to the radially retracted position and wherein, during rotational movement of the motor, centrifugal force moves the one brush toward the radially extended position, wherein, as a rotational velocity of the rotor increases, the one brush moves closer to the radially extended position;

a commutator plate mounted fixedly in relation to a housing of the motor, wherein the rotor rotates in relation to the commutator plate;

an annular portion of the commutator plate coaxial with the rotor, the annular portion having an inner radius engaging the one brush when the one brush is in the radially retracted position, the annular portion having an outer radius engaging the one brush when the one brush is in the radially extended position; and a plurality of contactors in the annular portion of the commutator plate, the contactors extending from the inner radius to the outer radius.

2. An electric motor in accordance with claim 1, wherein, each contactor has a leading edge extending, from the inner radius to the outer radius, at an angle acute to a vector tangent, at the inner radius, to a direction of rotation of the rotor.

3. An electric motor in accordance with claim 1, also comprising an annular contact ring mounted on the commutator plate radially interior of the annular portion.

4. An electric motor in accordance with claim 2, also comprising a plurality of stator phase coils, each of the plurality of stator phase coils connected to a different one of the plurality of contactors, wherein, as rotational velocity of the motor increases, the movement of the one brush closer to the radially extended position provides a phase advance of energization of the stator coils.

5. An electric motor in accordance with claim 3, also comprising a contactor ring brush mounted on the commutator brush retainer and making brush contact with the contactor ring.

6. An electric motor in accordance with claim 5, wherein the one brush is mounted in the commutator brush retainer by a first brush holder with a first post extending from the first brush holder in a direction away from the one brush, wherein the contactor ring brush is maintained in the commutator brush retainer by a second brush holder with a second post extending from the second brush holder in a direction away from the contactor ring brush, wherein the spring is a torsion spring with a first end wrapped around the first post extending from the first brush holder and a second end wrapped round the second post extending from the second brush holder.

7. An electric motor in accordance with claim 6, wherein the torsion spring provides an electrical path between the one brush and the contactor ring brush.

8. An electric motor comprising:

a rotatably mounted rotor;

a commutator brush retainer mounted fixedly with respect to the rotor, wherein the commutator brush retainer rotates with the rotor;

at least one brush slidably mounted to the commutator brush retainer, wherein the brush is slidable in a radial direction between a radially retracted position and a radially extended position;

a spring connected to the commutator brush retainer and to said one brush, wherein the spring biases the one brush to the radially retracted position, wherein, during rotational movement of the motor, centrifugal force moves the one brush toward the radially extended position, wherein, as a rotational velocity of the rotor increases, the one brush moves closer to the radially extended position;

a commutator plate mounted fixedly in relation to a housing of the motor, wherein the rotor rotates in relation to the commutator plate;

an annular portion of the commutator plate coaxial with the rotor, the annular portion having an inner radius engaging the one brush when the one brush is in the radially retracted position, the annular portion having an outer radius engaging the one brush when the one brush is in the radially extended position;

a plurality of contactors arcuately spaced in the annular portion of the commutator plate, each of the plurality of contactors extending from the inner radius to the outer radius;

an annular contact ring mounted on the commutator plate radially interior of the annular portion;

a contactor ring brush mounted on the commutator brush retainer and making brush contact with the contactor ring;

a first brush holder mounting the one brush to the commutator brush retainer, the first brush holder including a first post extending from the first brush holder in a direction away from the one brush;

a second brush holder mounting the contactor ring brush to the commutator brush retainer, the second brush holder including a second post extending from the second brush holder in a direction away from the contactor ring brush, wherein the spring is a torsion spring with a first end wrapped around the first post extending from the first brush holder and a second end wrapped round the second post extending from the second brush holder, wherein the torsion spring provides an electrical path between the one brush and the contactor ring brush.

9. An electric motor comprising:

a rotatably mounted rotor;

a commutator brush retainer mounted fixedly with respect to the rotor, wherein the commutator brush retainer rotates with the rotor;

a pair of diametrically opposed brushes slidably mounted to the commutator brush retainer, wherein each brush is slidable in a radial direction between a radially retracted position and a radially extended position; and means for providing a spring bias to the pair of brushes, wherein the spring bias maintains each brush in the radially retracted position and, wherein, during rotational movement of the motor, centrifugal force moves each brush toward the radially extended position, wherein, as a rotational velocity of the rotor increases, each brush moves closer to the radially extended position, wherein each brush faces in a brush direction parallel to an axis of rotation of the rotor and wherein each brush has a brush face on a brush direction side of the brush.

10. An electric motor in accordance with claim 9, also comprising a commutator plate fixedly mounted with respect to a motor housing, mounted proximate to the commutator brush retainer and axially spaced, in the brush direction, from the commutator brush retainer, wherein the brush face of each brush engages the commutator plate.

11. An electric motor comprising:

a rotatably mounted rotor;

a brush housing mounted fixedly with respect to the rotor, wherein the brush housing rotates with the rotor;

a pair of diametrically opposed brushes slidably mounted to the brush housing, wherein each brush is slidable in a radial direction between a radially retracted position and a radially extended position;

first and second radial springs biasing the brushes in the radially retracted positions wherein, during rotational movement of the motor, centrifugal force moves each brush toward the radially extended position, wherein, as a rotational velocity of the rotor increases, each brush moves closer to the radially extended position;

a pair of brush holders, wherein each brush in the pair of brushes is mounted in one of the brush holders, wherein each radial spring has a center that presses against one of the brush holders; and a retaining ring that fits annularly around the brush housing, wherein each radial spring has extending arms that slide along an inner surface of the retaining ring as the center of the radial spring is deflected in the radially extended direction.

12. An electric motor comprising a rotatably mounted rotor;

a brush housing mounted fixedly with respect to the rotor, wherein the brush housing rotates with the rotor;

a pair of diametrically opposed brushes slidably mounted to the brush housing, wherein each brush is slidable in a radial direction between a radially retracted position and a radially extended position;

first and second radial springs biasing the brushes in the radially retracted positions wherein, during rotational movement of the motor, centrifugal force moves each brush toward the radially extended position, wherein, as a rotational velocity of the rotor increases, each brush moves closer to the radially extended position; and an commutator plate including a plurality of contactor plates contacted by the brushes, wherein, between each neighboring contactor plates is a non-electrically biased raised surface, wherein the raised surfaces prevent the brushes from making direct connection across the two neighboring contact plates for an extended period of time, thereby preventing the creation of torque counter to a desired direction of motor rotation.

13. An electric motor comprising:

n stator coil phases;

a rotor with m soft magnetic poles;

a commutator for selectively energizing the n stator coil phases;

a commutator plate in the commutator, wherein the commutator plate has n*m+1 contact plates in an annular contact area of the contact plate, wherein n*m of the n*m+1 contact plates are each coupled to the stator coil phases.

14. An electric motor according to claim 13, wherein the annular contact area has first and second diametrically opposed 180 degree arcuate portions, wherein the n*m contact plates coupled to the n stator coil phases are disposed in the first 180 degree arcuate portion and wherein the other contact plate is disposed in the second 180 degree arcuate portion.

15. An electric motor comprising:

a rotatably mounted rotor;

a commutator brush retainer mounted fixedly with respect to the rotor, wherein the commutator brush retainer rotates with the rotor;

at least one brush slidably mounted to the commutator brush retainer, wherein the brush is slidable in a radial direction between a radially retracted position and a radially extended position; and at least one spring for providing a spring bias to the brush, wherein the spring bias maintains the brush in the radially retracted position and wherein, during rotational movement of the motor, centrifugal force moves the brush toward the radially extended position, wherein, as a rotational velocity of the rotor increases, the brush moves closer to the radially extended position; and a commutator plate fixedly mounted with respect to a motor housing, mounted proximate to the commutator brush retainer and spaced in a direction parallel to an axis of the rotor therefrom, wherein the brush has a face engaging the commutator plate.

* * * * *